June 4, 1963
C. W. MacMILLAN
3,091,862
ALIGNING DEVICE FOR ASSISTING IN CENTERING
AN AUTOMOBILE STEERING WHEEL
Filed May 27, 1959
2 Sheets-Sheet 1
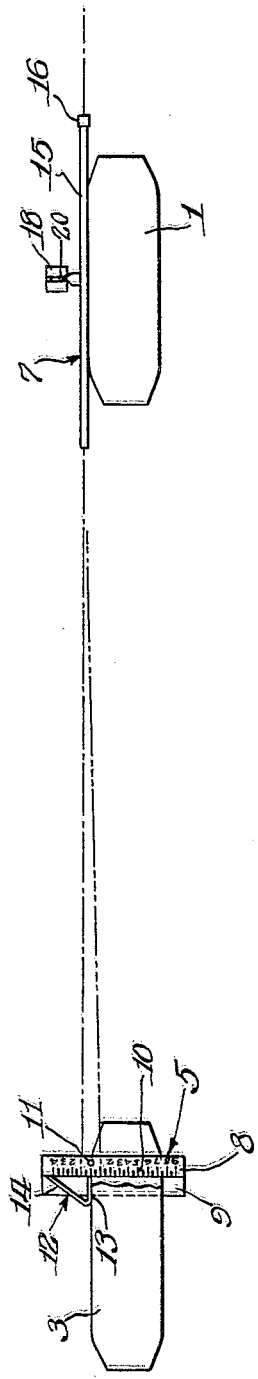
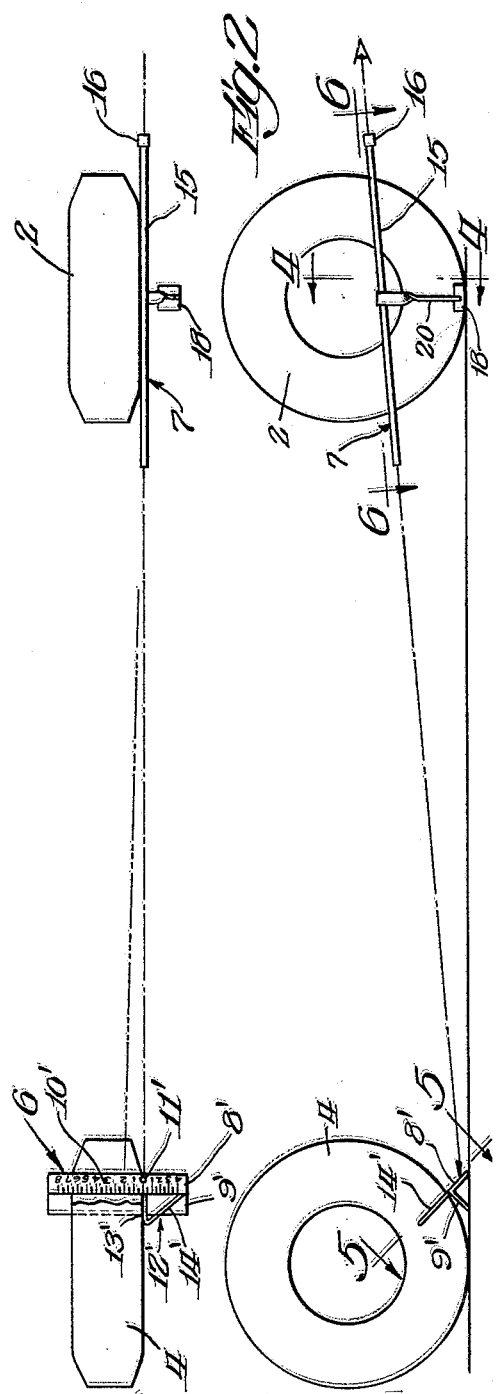
Inventor:
Charles W. MacMillan
By Gary, Desmond & Parker
attys.

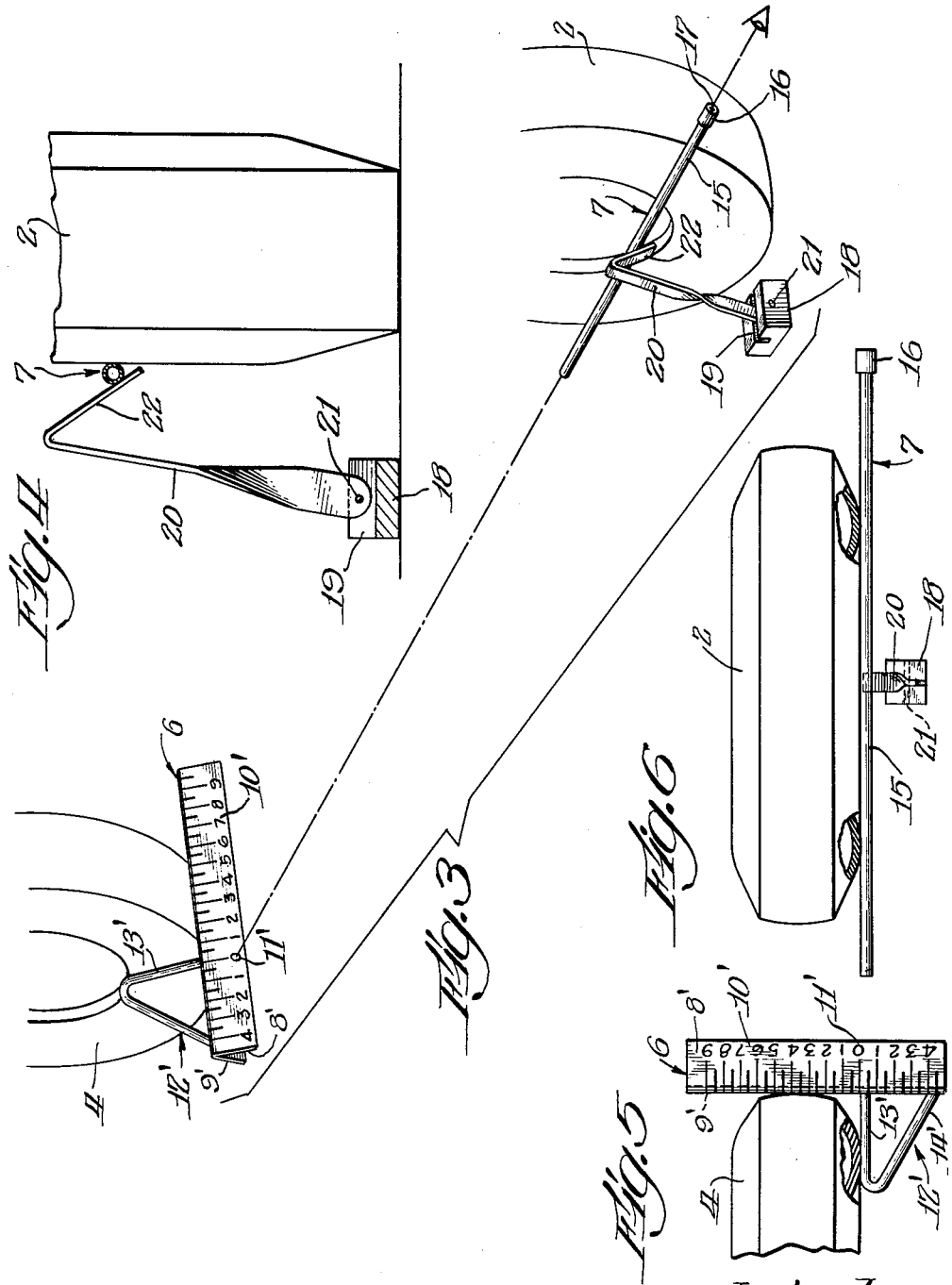

United States Patent Office 3,091,862
Patented June 4, 1963

3,091,862
ALIGNING DEVICE FOR ASSISTING IN CENTERING AN AUTOMOBILE STEERING WHEEL
Charles W. MacMillan, Rock Island, Ill., assignor to Bear Manufacturing Company, Rock Island, Ill., a corporation of Delaware
Filed May 27, 1959, Ser. No. 816,247
5 Claims. (Cl. 33—46)

This invention relates to improvements in a device for assisting in centering the steering wheel of an automotive vehicle.

It is the practice, when the wheels of an automotive vehicle are in straight-ahead position, to have the steering wheel of the vehicle disposed upon the steering spindle in such manner as to have the spokes of the steering wheel symmetrically disposed about an imaginary line through the axis of a vertical or horizontal spoke. The steering wheel is then considered to be "centered."

This is normally an original factory adjustment, but during use of the vehicle, particularly where the steering geometry (caster, camber, toe-in, etc.) changes and adjustments are made to said steering geometry, the steering wheel becomes decentered. To "center" the steering wheel requires that the front and rear wheels of the vehicle first be disposed so that when the vehicle is driven in a straight line, the rear wheels follow the front wheels in paths symmetrically parallel to those of the front wheels. When this condition obtains, the steering wheel may then be quickly centered.

The present invention is directed to a device by which the desired relationship of the wheels in straight-ahead position can be ascertained, the device being characterized by its simplicity and ease and convenience of use.

The features, objects and advantages of the invention will be apparent from the accompanying drawings and following detailed description.

In the drawings,

FIG. 1 is a diagrammatic plan view of the characteristic positions of the wheels of an automobile, the body of the automobile not being shown.

FIG. 2 is a diagrammatic side elevational view of the wheels shown in FIG. 1.

FIG. 3 is an enlarged perspective view showing the target, employed in the present invention, associated with a rear wheel, and a sighting tube and support, employed in the invention, associated with a front wheel.

FIG. 4 is an enlarged fragmentary end view taken on line 4—4 of FIG. 2 of the sighting tube and support, associated with the front wheel.

FIG. 5 is an enlarged fragmentary view taken on line 5—5 of FIG. 2, of the target associated with the rear wheel.

FIG. 6 is a plan view taken on line 6—6 of FIG. 2, showing the association of the sighting tube with the front wheel.

In commencing the test, the front wheels 1 and 2, of a conventional automotive vehicle (not shown) are disposed in approximate straight-ahead position, the rear wheels 3 and 4, if the wheels track properly, are disposed in about the position shown in FIG. 1, wheel 3 being substantially behind wheel 1, and wheel 4 being substantially behind wheel 2. Wheels 3 and 4 are usually not directly behind the wheels 1 and 2, respectively, but will move along paths substantially parallel to the respective paths of wheels 1 and 2 when the vehicle moves in a straight line.

The device embodying the present invention comprises two targets 5 and 6 and one or two sighting tube assemblies 7. The targets 5 and 6 are similar except that one is left-hand and the other is right-hand, but the sighting tube assemblies, if two are used, are identical, and as will be hereinafter more fully described, only one may be used, but it will be used successively in association with the right-hand and left-hand targets.

For purposes of description, target 5 will be considered the left-hand target and the target 6 will be considered the right-hand target, the point of reference being an observer facing the front wheels 1 and 2 from the rear of the vehicle.

Target 5 comprises an angle member having legs or flanges 8 and 9 disposed at right-angles to each other. The outer face of leg or flange 8 carries a scale 10, having a zero point 11 on each side of which equal scale divisions are inscribed. Adjacent the right end of the angle member, facing the scale, an angular abutment 12 is carried by the angle member, one leg 13 of the abutment comprising at its inner or wheel engaging surface a straight-edge disposed in axial alignment with the zero point 11, said leg 13 extending along a line constituting a continuation of the plane of the angle flange 8. The other leg 14 of the abutment functions as a brace or reinforcement for the leg 13 of the abutment and also as a handle for the target 5.

The right-hand target 6 is similar to target 5 except that the abutment is disposed adjacent the left end portion of the angle member, facing the scale. Without further description, corresponding parts of the left-hand target 5 will be designated with corresponding primed numerals.

In employing the targets 5 and 6, the target 5 is disposed adjacent the left-hand rear wheel 3 whereby the axis of the angle member is disposed at right-angles to the plane of the wheel, the angle member resting on the outer edges of the flanges 8 and 9, and the scale facing upwardly and forwardly toward the front wheels of the vehicle. The straight-edge leg 13 of the abutment is brought into contacting alignment with the outer side of the tire carried by wheel 3 and, hence, the zero point 11 constitutes, in effect, a point on the outer face of the tire of wheel 3.

The right-hand target is similarly placed relative to wheel 4 establishing the zero point 11' as a point on the outer face of the wheel 4, points 11 and 11', respectively, lying in planes parallel to the planes of the wheels 3 and 4.

The sighting tube assembly constitutes a hollow, relatively elongated tube 15 of relatively small diameter. A fitting 16 is carried at one end of tube 15, said fitting having a relatively small "peep" hole 17 (FIG. 3) which is in alignment with the axis of the tube.

A portable bracket is employed to support the tube 15, as will be hereinafter more fully described, the bracket comprising a base member or anchor block 18 provided with a transverse slot 19 in which an end of an arm 20 is pivotally secured by pin 21. The upper end of the arm 20 is inclined reversely of the length of the arm, as shown best at 22 in FIGS. 3 and 4.

In employing the sighting tube assembly 7, the base or block 18 may be positioned outwardly from either wheel 1 or 2, and arm 20 may be swung about pin 21 until the end of the bent portion 22 of the arm contacts the tire of the wheel. A saddle is thus provided for supporting the sighting tube 15 whereby the tube may be sighted upon targets 5 or 6.

In employing the device comprising the present invention, the front wheels 1 and 2 may be disposed in approximate straight-ahead position. The right and left-hand targets may then be positioned as hereinbefore described relative to the rear wheels 3 and 4. The sighting tube assembly 7 may then be disposed adjacent one of the front wheels, in the manner hereinbefore described, or if two tube assemblies are employed, one assembly may be so disposed adjacent each front wheel.

When the tube assembly is disposed adjacent the selected front wheel, the tube 15 is disposed in contact with spaced portions of the side walls of the tire and, hence, the axis of the tube will be in a plane parallel to the plane of the wheel.

With the front wheels in approximate straight-ahead position, an observation is taken through tube 15. A scale marking on the target 5 or 6 is then observed. Depending upon the initial position of the front wheel, the scale marking observed may be zero; to the left of zero, or to the right of zero. A reading may be then made on the other side of the vehicle, and the scale marking may be noted. If the scale markings observed on both targets are not relatively similar, it indicates that the wheels are not in straight-ahead position. The front wheels may then be turned and the observations repeated until the observed scale markings on each target are relatively equal.

For example, if the observation is made from front wheel 2 to target 6 and scale division 2 is noted on the left side of zero 11'; and an observation is made from wheel 1 to target 5 and the scale division 2 on the right side of zero 11 is noted, the wheels are in straight-ahead position. If, however, the noted markings do not relatively agree, that is, if the same division marking on opposite sides of the respective zero points is not noted, the front wheels must be turned until, upon further observations, said notations agree. Of course, if the initial observations do not agree, the noted observations inform the operator, the approximate degree and direction the front wheels should be turned to secure agreement of the readings. An operator with relatively little practice can quickly secure agreement of the readings to obtain the straight-ahead position.

After the straight-ahead position is secured, the steering wheel can be properly centered by well known mechanical manipulations.

I claim as my invention:

1. In a wheel aligning device of the character described, a portable target associated with a wheel and comprising a horizontally extending member disposed transversely of the wheel on the same surface as the wheel, said member having a ground-engaging lower edge portion, a first face abutted against the tread of the wheel and a second face facing in the direction opposite said first face, an abutment fixed to said member in upwardly inclined relation to said ground engaging lower edge portion and extending a substantial distance therefrom in the direction in which said first face faces, said abutment including a straight-edge perpendicular to said member abutted against the side of the wheel, and a scale on said second face having its zero aligned substantially with said straight-edge.

2. In a wheel aligning device of the character described, a portable target associated with a wheel and comprising a horizontally extending angle member defining an inverted V and disposed transversely of the wheel on the same surface as the wheel, said member having a pair of ground-engaging lower edges, a first face abutted against the tread of the wheel and a second face facing in the direction opposite said first face, an abutment fixed to said member and extending a substantial distance therefrom at an upward inclination in the direction in which said first face faces, said abutment comprising an angular rod including a first leg perpendicular to said member abutted against the side of the wheel and a second leg comprising a handle for the target, and a scale on said second face having its zero aligned substantially with said first leg of said abutment.

3. In a wheel aligning device of the character described, a sighting assembly associated with a wheel and comprising a base member rested on the same surface as the wheel adjacent one side of the wheel, an arm pivotally mounted on said base member and extending upwardly therefrom, said arm being disposed substantially along the vertical center line of the wheel and engaged with said one side of the wheel adjacent its upper end, said arm having an upwardly facing rest surface thereon located adjacent the midpoint of the wheel, and an elongate sighting member rested on said rest surface and engaged with generally horizontally opposed portions of said one side of the wheel.

4. A device for checking the straight-ahead position of the wheels of an automotive vehicle comprising, in combination, a portable target associated with a rear wheel of the vehicle and comprising a horizontally extending member disposed transversely of the rear wheel on the same surface as the wheel, said member having a ground-engaging lower edge portion, a front face and a rear face abutted against the tread of the rear wheel at the forward face of the wheel, an abutment secured to said member and extending rearwardly therefrom, said abutment including a straight-edge portion perpendicular to said member abutted against the outer side of the rear wheel, and a scale on said front face having a datum mark aligned substantially with said straight-edge portion, and a sighting assembly associated with the corresponding front wheel of the vehicle and comprising a base member rested on the same surface as the front wheel adjacent the outer side of the wheel, an arm pivotally mounted on said base member and extending upwardly therefrom, said arm being disposed substantially along the vertical center line of the front wheel and engaged with the outer side of the front wheel adjacent its upper end, said arm having an upwardly facing rest surface thereon located adjacent the midpoint of the front wheel, and an elongate sighting member rested on said rest surface and engaged with generally horizontally opposed portions of the outer side of the front wheel for sighting said target in a plane parallel to the plane of the front wheel.

5. A device for checking the straight-ahead position of the wheels of an automotive vehicle comprising, in combination, a portable target positioned against the tire of a rear wheel of a vehicle, said target consisting essentially of an elongated wheel stop having a ground-engaging lower edge portion rested on the same surface as the wheel with the wheel stop abutted transversely of its length against the tire tread at the forward face of the respective rear wheel, an abutment secured to said wheel stop and extending upwardly and rearwardly therefrom, said abutment including a straight inner edge extending at right angles to said wheel stop intermediate the length of the stop and abutted against the outer side wall of the tire on the respective rear wheel, and a forwardly facing scale on said wheel stop along the length thereof having a datum indication aligned with said inner edge of said abutment, and a portable sighting assembly positioned against the tire of the corresponding front wheel of the vehicle, said assembly comprising a bracket having a ground-engaging anchor block rested on the same surface as the wheels immediately outwardly of the respective front wheel adjacent the vertical center line thereof and an upstanding arm having an inclined inner surface which converges downwardly toward the respective front wheel, and an elongate sighting member removably rested on said inclined surface of said arm in engagement with portions of the outer side wall of the tire on the respective front wheel which portions are spaced forwardly and rearwardly of said bracket, whereby said target is disposed with its scale transverse to the respective rear wheel and with the datum indication of the scale substantially in alignment with the side wall of the tire on the respective rear wheel and said sighting member is supported substantially in the plane of the side wall of the tire on the respective front wheel for sighting the target in a plane substantially parallel to the plane of the respective front wheel.

References Cited in the file of this patent

UNITED STATES PATENTS

| | | |
|---|---|---|
| 833,168 | Keller | Oct. 16, 1906 |
| 1,667,444 | Smith | Apr. 24, 1928 |
| 2,689,403 | Wilkerson | Sept. 21, 1954 |
| 2,755,554 | MacMillan | July 24, 1956 |
| 2,914,855 | Daum | Dec. 1, 1959 |
| 2,958,134 | Wilkerson | Nov. 1, 1960 |

FOREIGN PATENTS

| | | |
|---|---|---|
| 760,333 | France | Mar. 30, 1931 |